United States Patent Office 3,154,533
Patented Oct. 27, 1964

3,154,533
NEW AZO DYESTUFFS
Julius Eisele, Ludwigshafen (Rhine), Wilhelm Federkiel, Frankenthal, Pfalz, Curt Schuster and Robert Gehm, Ludwigshafen (Rhine), Arnold Tartter, Lambsheim, Pfalz, and Fritz Graser, Werner Rohland, and Erich Stoeckl, Ludwigshafen (Rhine), Germany, assignors to Badische Anilin- & Soda-Fabrik Aktiengesellschaft, Ludwigshafen (Rhine), Germany
No Drawing. Original application Dec. 18, 1957, Ser. No. 703,485. Divided and this application May 22, 1959, Ser. No. 818,995
Claims priority, application Germany, Dec. 19, 1956, B 42,872; Nov. 8, 1957, B 46,701; Nov. 16, 1957, B 46,811
4 Claims. (Cl. 260—162)

This invention relates to dyestuffs which contain at least once the grouping:

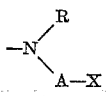

in which R represents a hydrogen atom, an alkyl, aralkyl, cycloalkyl, aryl, halogenalkyl, hydroxyalkyl or acyl group, A an alkylene radical with up to 4 carbon atoms in the chain, which may be branched and/or may contain hydroxyl groups, and X a chlorine or bromine atom, and to methods for the production of such dyestuffs.

The invention relates more specifically to dyestuffs which contain at least once the grouping

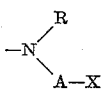

(R, A and X having the above significance) and which are capable of dyeing or printing structures of natural and/or regenerated cellulose.

We have found that valuable water-soluble azo dyestuffs are obtained by acylating water-soluble azo dyestuffs which contain at least one acylatable primary or secondary amino group with arylcarboxylic acid halide sulfonic acid halogen alkylamides or by coupling any aromatic diazo compounds with coupling components which contain at least one primary or secondary amino group which has been acylated with an arylcarboxylic acid halide sulfonic acid halogen alkylamide, or by coupling diazotized aromatic amines which contain at least one primary or secondary amino group acylated with an aryl-carboxylic acid halide sulfonic acid halogen alkylamide with any coupling component, and the coupling components may also contain primary or secondary amino groups acylated with arylcarboxylic acid halide sulfonic acid halogen alkylamides.

Dyestuffs obtainable according to this process are for example water-soluble monoazo dyestuffs of the general formula

A—N=N—D which contain up to two —NH.CO.Ar.SO$_2$.X— groups, wherein A represents an aromatic radical which contains one benzene nucleus, D a radical selected from the group consisting of aromatic and heterocyclic radicals which contain up to two benzene nuclei, Ar an aromatic radical which contains up to two benzene nuclei, and X the radical of a halogen alkyl amine which contains up to four carbon atoms.

The new water-soluble azo dyestuffs correspond to the general formula

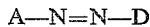

in which G represents the radical of a water-soluble azo dyestuff, R' hydrogen, alkyl, aralkyl, aryl, hydroxyalkyl or halogenalkyl and R the radical of an aromatic carboxylic acid sulfonic acid halogen alkylamide which contains for example up to two benzene nuclei and of which the aromatic radical may carry further substituents, such as alkyl, aralkyl, aryl, hydroxyl, alkoxyl, aroxyl, sulfonic acid, sulfonic acid halogen alkylamide or nitro groups and/or halogen atoms.

For the production of such dyestuffs, any water-soluble azo dyestuffs, provided they contain only at least one acylatable primary or secondary amino group, may be reacted with carboxylic acid halides of aromatic sulfonic acid halogenalkylamides.

As arylcarboxylic acid halide sulfonic acid halogen alkylamides which contain for example up to two benzene nuclei, there may be mentioned for example benzene or naphthalene carboxylic acid chloride or bromide sulfonic acid chlor- or brom-alkylamides, which may contain in the aryl radical further substituents, such as alkyl, aralkyl, aryl, hydroxyl, alkoxyl, aroxyl, sulfonic acid sulfonic acid halogen alkylamide or nitro groups and/or halogen atoms, such as chlorine or bromine atoms, for example halogenalkylamides which contain in the alkyl radical up to four carbon atoms, such as beta-chlorethyl-amides, beta-bromethylamides, beta- or gamma-chlor-propylamides of 1-benzoyl chloride-3-sulfonic acid, 1-benzoyl chloride-4-sulfonic acid, 2- or 4-chlor-1-benzoyl chloride-5-sulfonic acid, 2- or 4-methyl-1-benzoyl chloride-5-sulfonic acid, 4-brom-1-benzoyl chloride-3-sulfonic acid, 2-hydroxy-1-benzoyl chloride-5-sulfonic acid, 2-hydroxy-3-methyl - 1 - benzoyl chloride-5-sulfonic acid, 2-methoxy-1-benzoyl chloride - 5 - sulfonic acid, 3-nitro-1-benzoyl chloride-5-sulfonic acid, 4-phenyl-1-benzoyl chloride-x-monosulfonic acid, naphthalene-1-carboxylic acid chloride-x-monosulfonic acid or 2-hydroxy-naphthalene-3-carboxylic acid chloride-1-sulfonic acid.

A further method for the preparation of these dyestuffs consists in coupling any diazo compounds which contain for example a benzene nucleus, with coupling components which contain at least one primary or secondary amino group acylated with the said arylcarboxylic acid halide sulfonic acid halogen alkylamides.

Suitable coupling components are for example aromatic or heterocyclic amines acylated with the said aryl-carboxylic acid halide sulfonic acid halogen alkylamides, which contain for example up to two benzene rings, such as aminohydroxybenzenes, aminohydroxyalkylbenzenes, aminohydroxyhalogenbenzenes, aminohydroxynitrobenzenes, aminoalkoxybenzenes, di- or poly-aminobenzenes, aminohydroxynaphthalenes, aminophenylmethylpyrazolones and their sulfonic acids, sulfonic acid amides or sulfones, the water-solubilizing group being contained in the diazo components and/or the coupling components.

On the other hand aromatic polyamines in which at least one primary or secondary amino group is acylated with the said arylcarboxylic acid halide sulfonic acid halogen alkylamides and which moreover still contain a free diazotizable amino group, may be diazotized and coupled with any coupling component.

Suitable compounds of this kind are for example aromatic diamines partly acylated with the said arylcarboxylic acid halide sulfonic acid halogen alkylamides, which may for example contain one benzene nucleus, such as 1.4-diamino-benzene-3-sulfonic acid, 1.3 - diaminobenzene-4-sulfonic acid or 1.4-diamino-3-nitrobenzene.

In this case also the water solubilizing group may be contained in the diazo components and/or in the coupling components.

The new dyestuffs give on wool, cotton natural silk and linear polyamides, dyeings and prints of excellent fastness to moisture.

With the new dyestuffs, dyeings and prints of very good fastness to moisture and rubbing can be produced on structures, such as fibres, flocks, threads, woven or knitted fabrics of natural and/or regenerated cellulose by treating the cellulose with alkaline agents before or during or after the dyeing or printing and then if necessary by heating for a short time of about one to ten minutes to temperatures from 100° C. up to 200° C. There thereby probably takes place a linkage of the dyestuff residue by means of the group A to oxygen atoms of the cellulose, comparable with alkylation, whereby alkali halide is split off.

The dyestuffs which contain the grouping

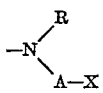

insofar as they are sufficiently soluble in water, can be used for dyeing from aqueous solution. Dyestuffs which are insoluble in water are used in finely dispersed form.

The process can be carried out by slop-padding the cellulose with a solution or dispersion of the dyestuff and leading it preferably after drying, through a bath which contains alkali, for example, sodium or potassium hydroxide or carbonate or bicarbonate, the dyestuff then being fixed on the fibre by steaming.

The alkali may, however, also be added to the dyebath and the dyestuff fixed by gradual increase in the bath temperature. Finally the cellulose may also be pretreated with a solution of alkali hydroxide at elevated temperature, dried, then dyed with a dyestuff of the kind according to this invention and aftertreated with hot air.

Since the reactivity of the halogen atom X is different in each case, the dyeing procedure, i.e., especially the nature and concentration of the alkali, the duration and temperature of the alkali treatment and the steaming or hot air treatment, must be adapted to the dyestuff concerned; the most favorable conditions can readily be determined by preliminary experiments.

The process may be used both with natural and with regenerated cellulose, and indeed both with fibres and with fabrics, flocks, threads and knitted goods.

The dyeing thus obtained have very good fastness to water, washing and rubbing.

In the case of printing, the dyestuff is brought onto the fibre together with a thickening agent, such as sodium alginate or tragacanth, and an alkaline agent, and then dried and steamed. The fabric may also be printed with the dyestuff together with a thickening agent and the usual printing auxiliaries, dried, led through a bath charged with an alkaline agent, dried and then steamed. The prints thus obtained have very good fastness to light, moisture and rubbing.

The following examples will further illustrate this invention but the invention is not restricted to these examples. The parts specified in the examples are parts by weight, and the percentages specified are percentages by weight.

*Example 1*

17.3 parts of 1-aminobenzene-4-sulfonic acid are diazotized in the usual way and coupled in a weakly alkaline liquid with 31.9 parts of 1-amino-8-hydroxynaphthalene-3.6-disulfonic acid. The dyestuff solution is brought to pH 6 to 7 and cooled to 0° to +2° C. While maintaining this temperature, a solution of 28.2 parts of benzoyl chloride-meta-sulfonic acid-beta-chlorethylamide in 85 parts of anhydrous acetone is slowly added and at the same time a 10% aqueous solution of sodium carbonate is introduced in such a way that the pH remains at 6 to 7. The whole is further stirred for 2 hours and the dyestuff deposited by the addition of sodium chloride. The dyestuff dyes wool and linear polyamides red shades of excellent wet fastness.

The dyestuffs set out in the following table can be obtained in the same way.

| Example No. | Diazo component | Coupling component | Acylated with— | Color |
|---|---|---|---|---|
| 2 | 1-amino-benzene-4-sulfonic acid. | 1-amino-8-hydroxy-naphthalene-3.6-disulfonic acid. | Benzoyl chloride-para-sulfonic acid-beta-chlorethyl-amide. | Red. |
| 3 | do | 2-amino-5-hydroxy-naphthalene-7-sulfonic acid. | Benzoyl chloride-meta-sulfonic acid-beta-chlorethyl-amide. | Red. |
| 4 | do | 1-amino-8-hydroxy-naphthalene-4-sulfonic acid. | do | Blue. |
| 5 | 1-acetylamino-4-amino-benzene-3-sulfonic acid. | 2-amino-8-hydroxy-naphthalene-6-sulfonic acid. | do | Red. |
| 6 | 1-amino-4-nitrobenzene-2-sulfonic acid. | do | do | Violet. |

*Example 7*

31.9 parts of 1-amino-8-hydroxynaphthalene-3.6-disulfonic acid are dissolved in water, brought to pH 7 and cooled to 0° to +2° C. While maintaining this temperature, a solution of 28.3 parts of benzoyl chloride-meta-sulfonic acid-beta-chlorethylamide in 85 parts of anhydrous acetone is slowly added and at the same time a 10% aqueous sodium carbonate solution is added in such a way that the pH remains at 6 to 7. The whole is further stirred for 2 hours and this solution united at pH 7 with a diazo solution obtained in the usual way from 17.3 parts of 1-aminobenzene-4-sulfonic acid.

The dyestuff obtained dyes wool and linear polyamides red shades of excellent wet fastness.

*Example 8*

18.6 parts of 1.4-diaminobenzene-2-sulfonic acid are dissolved in water and brought to pH 7. After it has been cooled to 0° to +2° C. a solution of 29.6 parts of benzoyl chloride-meta-sulfonic acid-beta chlorisopropylamide in 85 parts of anhydrous acetone is allowed to flow in slowly while maintaining the said temperature, and at the same time a 10% aqueous sodium carbonate solution is introduced in such a way that a pH of 6 to 7 is maintained. It is then stirred for another 2 hours, diazotized in the usual way and coupled with a solution of 25.4 parts of 1-(3'-sulfonic_acid)-phenyl-3-methylpyrazolone-(5).

A dyestuff is obtained which dyes wool, and linear polyamides yellow shades of excellent wet fastness.

*Example 9*

18.6 parts of 1.4-diaminobenzene-2-sulfonic acid are reacted with 29.6 parts of benzoyl chloride-para-sulfonic acid-beta-chlorisopropylamide and diazotized as described in Example 8. The diazo solution obtained in this way is coupled at pH 7.5 with a coupling component which has been obtained by reacting 31.9 parts of 1-amino-8-hydroxynaphthalene-3.6-disulfonic acid in aqueous solution at pH 7 and at 0° to +2° C. with a solution of 29.6 parts of benzoyl chloride-para-sulfonic acid-beta-chlorisopropylamide in acetone.

The dyestuff dyes wool and linear, polyamides violet shades of excellent wet fastness.

This is a divisional application of copending application Serial Number 703,485 filed on December 18, 1957, by Julius Eisele, Curt Schuster, Arnold Tartter, Werner Rohland, Wilhelm Federkiel, Robert Gehm, Fritz Graser and Erich Stoeckl.

What we claim is:

1. A water-soluble monoazo dyestuff selected from the class consisting of compounds of the formulae:

(I) 

and (II) 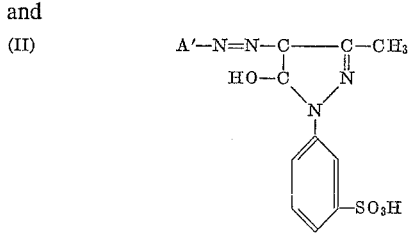

wherein A is a member selected from the group consisting of

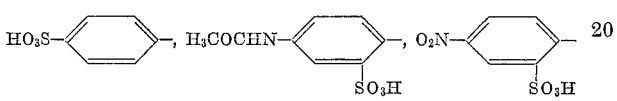

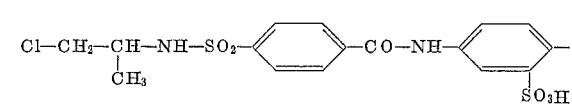

and

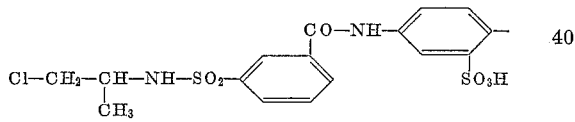

A' is a member selected from the group consisting of

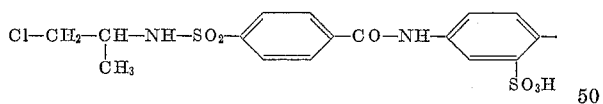

and

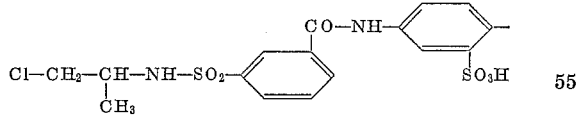

D—OH is a member selected from the group consisting of naphtholmonosulfonic acid and naphtholdisulfonic acid bound to the azo linkage in a position vicinal to the hydroxyl group and R is a member selected from the group consisting of

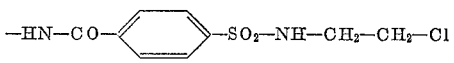

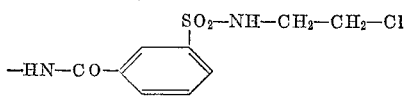

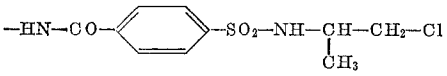

and

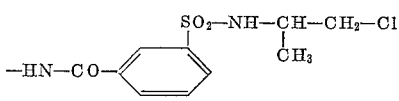

2. The dyestuff of the formula

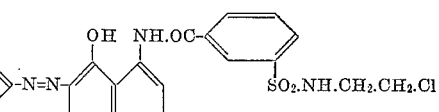

3. The dyestuff of the formula

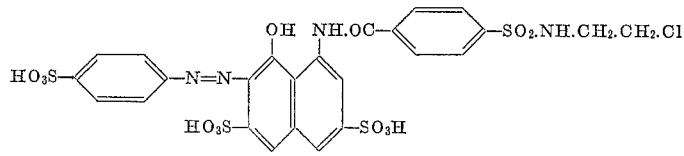

4. The dyestuff of the formula

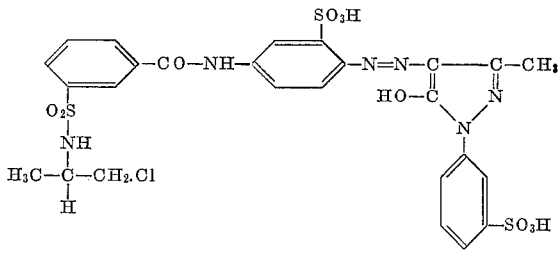

References Cited in the file of this patent

UNITED STATES PATENTS

| | | |
|---|---|---|
| 1,114,771 | Jordan et al. | Oct. 27, 1914 |
| 2,766,231 | Bolliger | Oct. 9, 1956 |
| 2,991,280 | Schetty et al. | July 4, 1961 |

FOREIGN PATENTS

| | | |
|---|---|---|
| 226,850 | Switzerland | Aug. 2, 1943 |
| 57,760 | Netherlands | June 15, 1946 |
| 63,647 | Netherlands | July 15, 1949 |